April 22, 1969     H. PITT ET AL     3,440,459
TRANSDUCER PICKUP
Filed March 3, 1966
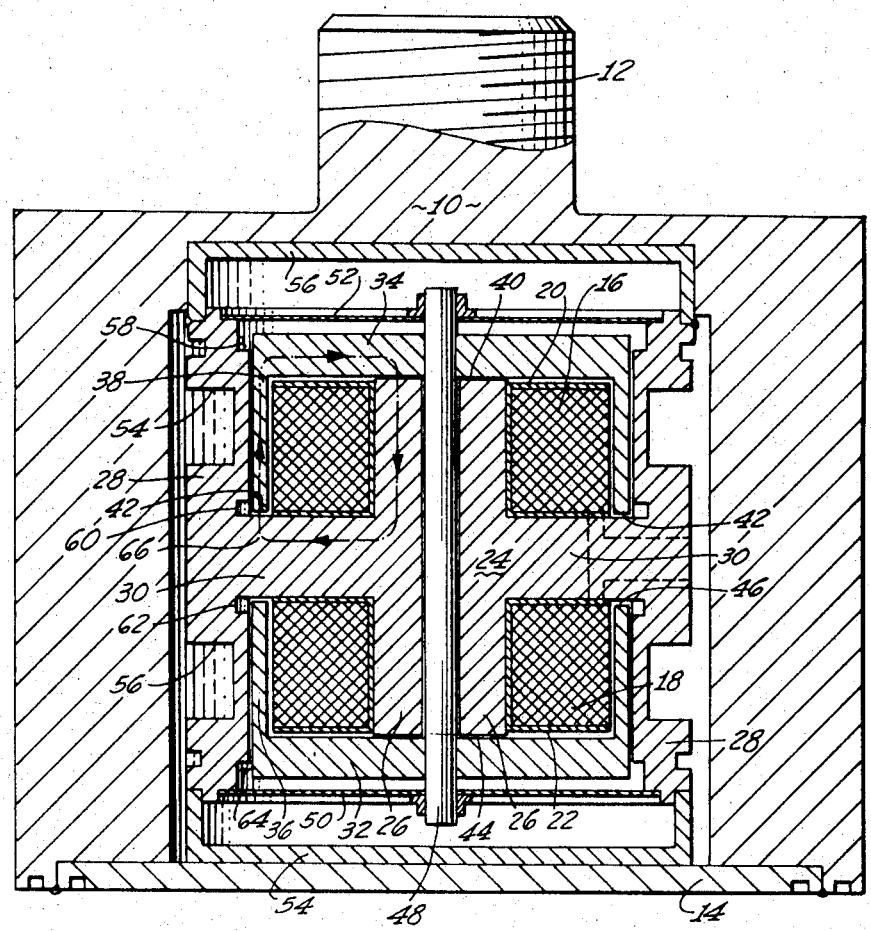
INVENTORS
HOWARD PITT
MARSHALL CANTOR
ATTORNEYS 3,440,459
TRANSDUCER PICKUP
Howard Pitt, Glendora, and Marshall Cantor, Van Nuys, Calif., assignors to Physical Sciences Corporation, Arcadia, Calif., a corporation of California
Filed Mar. 3, 1966, Ser. No. 531,478
Int. Cl. H02k 33/00, 35/00
U.S. Cl. 310—15       5 Claims

ABSTRACT OF THE DISCLOSURE

The present invention is directed to a transducer pickup which may include one or two coils. In the two-coil construction a cross-section through the transducer pickup produces a double figure-8 configuration for the magnetic structure. The double figure-8 configuration is composed of a pair of concentric cylindrical members joined by a central web and a pair of core members closing off the ends of the cylindrical members. The electrical coils are disposed within the recesses defined by the cylindrical members, the central web and the core members. The core members additionally have portions which are extended into the recesses to produce a better magnetic path for the magnetic flux.

---

This invention relates to a transducer pickup. In particular, the transducer pickup of the invention may be used in different types of transducers which provide many diverse transducer functions. For example, the transducer pickup of the invention may be used in transducer structures operating in such diverse ways as a vibrometer, an accelerometer, a pressure transducer or any other type of transducer which uses the physical movement of a magnetic core in response to a physical stimulus to produce output signals from one or more electrical coils. In particular, the transducer pickup of the invention uses a pair of electrical coils in association with a pair of paramagnetic masses.

The invention specifically relates to a transducer pickup which has a highly efficient magnetic circuit so as to produce relatively high output signals from the transducer. It has been a problem in the prior art transducers to produce a sufficiently high output signal from the prior art transducer. This is especially true when the prior art transducers are operating in response to physical stimuli and where the physical stimuli produce a relatively low physical displacement of the magnetic core within the transducer structure. The invention, in particular, produces a relatively high output signal from the transducer pickup in response to physical displacements of the magnetic core within the transducer which are relatively low.

The transducer pickup of the present invention has a highly efficient magnetic circuit in order to produce the relatively high output signals. The coils within the transducer pickup of the present invention are completely surrounded by magnetic material with the exception of air gaps. Since the transducer pickup of the present invention uses two coils, a cross section through the transducer pickup of the present invention produces a double-eight configuration for the magnetic structure. The double-eight configuration is composed of a pair of concentric cylindrical members joined by a central web, and a pair of core members closing off the ends of the cylindrical members. The electrical coils are disposed within the recesses defined by the cylindrical members, the central web and the core members. The core members additionally have portions which extend into the recesses to produce a better magnetic path for the magnetic flux. The outside cylindrical member also includes cutout portions to produce magnetic flux through the core members.

Each of the coils within the transducer pickup of the present invention has two air gaps between the core member and the cylindrical members. The air gaps associated with each coil are designed so as to have larger and smaller values at the same time. However, the air gaps associated with the different coils are designed so as to have an opposite relationship to each other. In this manner, as the air gaps associated with one coil become smaller the air gaps associated with the other coil become larger. A clearer understanding of the present invention will be had with reference to the drawing wherein:

The drawing illustrates a cross-sectional view of a transducer pickup constructed in accordance with the concepts of the invention.

In the drawing a transducer pickup 10 is enclosed by an outer case 12. The transducer pickup 10 slides into the outer case 12 and an end plate 14 seals the transducer pickup 10 within the outer case 12. The transducer pickup 10 includes a pair of coils 16 and 18. The coils 16 and 18 are wound on bobbins 20 and 22. The bobbins 20 and 22 are then slid into recesses in a member 24 composed of magnetic material.

As can be seen in the drawing the magnetic member 24 includes a pair of cylindrical members 26 and 28 which are joined by a central web or flange member 30. The coils 16 and 18 mounted on the bobbins 20 and 22 are disposed within the open ended recesses in the member 24. A pair of core members 32 and 34 close off the open ends of the member 24. In addition, the core members 32 and 34 have flanges 36 and 38 which extend within the recesses in the member 24 and partially surround the coils 16 and 18. It is to be noted that both the core members 32 and 34 and the member 24 are made of magnetic material. The combination of the core members 32 and 34 and the member 24 completely surround the coils 16 and 18 with the exception of air gaps 40, 42, 44 and 46. The cross-sectional configuration of the magnetic structure of the drawing, which includes the core members 32 and 34 and the member 24, is that of a double eight.

A core rod 48 connects the magnetic cores 32 and 34 so that the magnetic cores move in unison in response to an outside physical stimulus. The core rod is constructed of nonmagnetic material. The core rod 48 is also connected at its ends to a pair of diaphragms 50 and 52. The diaphrams 50 and 52 are flexible and maintain the cores 32 and 34 and core rod 48 in a central position within the transducer when there is no outside stimulus to the transducer. A pair of cap elements 54 and 56 enclose the ends of the transducer 10 and seal off the diaphragms 50 and 52.

The transducer pickup as shown in the drawing may be used for a variety of functions. For example, the transducer pickup may be used as an accelerometer, a vibrometer, a pressure transducer or any other sort of transducer wherein a physical stimulus is coupled to the transducer so as to produce movement of the cores 32 and 34 in response to the physical stimulus. It is to be appreciated that the various physical stimuli may be coupled to the transducer pickup in any appropriate manner. For example, fluid pressure may be introduced to the space between the diaphragm 50 and the end cap 54 in order to produce corresponding movements of the magnetic cores 32 and 34. In addition, vibration of the transducer pickup of the drawing directly produces movement of the cores 32 and 34 in response to the vibration. It is also to be noted that appropriate electrical terminals would be provided for the electrical coils 16 and 18.

It is also to be appreciated that the transducer shown in the drawing may produce an electrical output from the electrical coils 16 and 18 in a known manner. For example, an alternating signal may be applied to the coils 16 and 18 and the amplitude of the signal would be varied in accordance with the movement of the cores 32 and 34 in response to the movement of the cores 32 and 34. In addition, the magnetic material may be a permanent magnet material and the coils 16 and 18 would, therefore, operate as a generator structure to produce an alternating output signal in accordance with the movement of the cores 32 and 34.

The transducer of the drawing includes cutout portions 54 and 56 in the outer cylindrical portion 28 of the member 24. The outer cylindrical portion 28 of the member 24 additionally includes cutouts 58, 60, 62 and 64. All of the cutouts are used so that the magnetic flux path around a coil 82 kept within the core member and as close to the coil as possible. For example, a flux path 66 is shown surrounding the coil 16. When the flux path 66 is passing through the air gap 42 the cutout 60 insures that the magnetic flux through the air gap 42 is less than a flux path around the air gap 42. By the same token the cutout 54 insures that the magnetic flux 66 continues down the flange portion of the core 38 rather than passing to the cylindrical portion 28 of the core member.

The flux paths around the coils 16 and 18 are therefore confined to close paths around the coils. However, the transducer pickup as shown in the drawing includes a great amount of magnetic material in relation to the size of the transducer pickup. The magnetic material completely surrounds the coils of the transducer pickup with the exception of the air gaps in order to insure a highly efficient magnetic structure. It is to be noted that as the air gaps for the coil 16 increase in size, the air gaps for the coil 18 has a corresponding decrease in size. The coils 16 and 18 therefore operate in a differential manner.

The transducer pickup of the drawing illustrates a highly efficient transducer structure wherein relatively small physical displacements of the cores 32 and 34 produce relatively significant changes in the coils 16 and 18. The transducer pickup of the drawing therefore produces larger output signals than prior art transducers when subjected to the same physical stimulus as the prior art transducers.

It is to be appreciated that the invention has been disclosed with reference to a particular embodiment but it is apparent that adaptations and modifications may be made. The invention, therefore, is only to be limited by the appended claims.

What is claimed is:
1. A transducer pickup, including
   a magnetic base element including first and second spaced upstanding cylindrical portions to form a recess between the upstanding cylindrical portions,
   a coil wound on the magnetic base element between the upstanding cylindrical portions and with the coil spaced from at least the first upstanding cylindrical portion, and
   a magnetic core element having an end portion disposed adjacent to the end of the second upstanding cylindrical portion and having a flange portion extending from the end portion and extending within the space between the coil and the first upstanding cylindrical portion,
   the combination of the magnetic base element and the magnetic core element constituting a magnetic path around the coil and having a first air gap between the end portion of the magnetic core element and the end of the second upstanding cylindrical portion and having a second air gap between the flange portion of the magnetic core element and the magnetic base element.

2. A transducer pickup, including
   a magnetic base element including first and second spaced cylindrical members extending from both sides of the magnetic base element to form a recess between the cylindrical members on each side of the magnetic base element,
   a pair of coils wound on the magnetic base element within the recesses and with each coil spaced from the first cylindrical member, and
   a pair of magnetic core elements each having an end portion disposed adjacent to an end of the second cylindrical member and each having a flange portion extending from the end portion and within the space between the coil and the second cylindrical member,
   the combination of the magnetic base element and the magnetic core elements constituting a magnetic path around the coils and having a pair of first air gaps between the end portions of the magnetic core elements and the ends of the second cylindrical member and having a pair of second air gaps between the flange portions of the magnetic core elements and the magnetic base element.

3. A transducer pickup, including
   a first cylindrical magnetic member,
   a second cylindrical magnetic member surrounding the first cylindrical member,
   a third magnetic member interposed between the first and second cylindrical members to form open ended recesses above and below the third member,
   a pair of electrical coils disposed individually within the open ended recesses, and
   a pair of movable magnetic core members disposed individually to close the open ended recesses and with the pair of movable magnetic core members each having a flange portion which extends into the open ended recesses.

4. The transducer of claim 3 wherein the pair of movable magnetic core members are coupled together by a core rod passing through the center of the first cylindrical magnetic member.

5. The transducer of claim 3 wherein the second cylindrical member has cut out portions to control magnetic flux paths within the transducer.

References Cited

UNITED STATES PATENTS

| | | | |
|---|---|---|---|
| 2,898,532 | 8/1959 | Wintermute | 310—35 XR |
| 3,094,635 | 6/1963 | Wysocki | 310—15 XR |
| 3,351,850 | 11/1967 | Crawford et al. | 310—15 XR |

FOREIGN PATENTS 1,022,854  1/1958  Germany.

MILTON O. HIRSHFIELD, *Primary Examiner.*

D. F. DUGGAN, *Assistant Examiner.*

U.S. Cl. X.R.

310—24